United States Patent
Zhao et al.

(10) Patent No.: US 11,470,155 B2
(45) Date of Patent: Oct. 11, 2022

(54) SUBSCRIPTION SERVER, SUBSCRIPTION TERMINAL, INFORMATION SUBSCRIPTION METHOD AND SYSTEM

(71) Applicant: BOE TECHNOLOGY GROUP CO., LTD., Beijing (CN)

(72) Inventors: Junjie Zhao, Beijing (CN); Jing Su, Beijing (CN); Qian Zhang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/054,617

(22) PCT Filed: Jan. 31, 2019

(86) PCT No.: PCT/CN2019/074122
§ 371 (c)(1),
(2) Date: Nov. 11, 2020

(87) PCT Pub. No.: WO2019/218728
PCT Pub. Date: Nov. 21, 2019

(65) Prior Publication Data
US 2021/0194967 A1    Jun. 24, 2021

(30) Foreign Application Priority Data
May 18, 2018 (CN) .......................... 201810479229.6

(51) Int. Cl.
*H04L 67/12* (2022.01)
*H04L 67/55* (2022.01)
(52) U.S. Cl.
CPC .............. *H04L 67/12* (2013.01); *H04L 67/55* (2022.05)
(58) Field of Classification Search
None
See application file for complete search history.

(56) References Cited

U.S. PATENT DOCUMENTS 7,275,250 B1   9/2007 Novik et al.
7,797,306 B1 * 9/2010 Pather .................... H04L 51/24
                                                        707/714
(Continued)

FOREIGN PATENT DOCUMENTS

CN   101459908 A   6/2009
CN   101742475 A   6/2010
(Continued)

OTHER PUBLICATIONS

"International Search Report and Written Opinion of the International Searching Authority with English language translation", International Application No. PCT/CN2019/074122, dated Apr. 22, 2019, 18 pp.
(Continued)

*Primary Examiner* — Chris Parry
*Assistant Examiner* — Abderrahmen Chouat
(74) *Attorney, Agent, or Firm* — Myers Bigel, P.A.

(57) ABSTRACT

The present disclosure relates to a subscription server, a subscription terminal and an information subscription method and system. The method includes establishing content information of a request from a first entity as first information of an event after determining that request information of the request satisfies an event notification rule in a subscription resource, obtaining second information of the event according to an associated object of the subscription resource, and sending a notification message containing the first information and the second information to a notified party of the subscription resource. The present disclosure may be applied to avoid increasing the network load of a requester and a notifying party, and ensure that an event will be handled in time after the notification message of the event is received.

17 Claims, 7 Drawing Sheets

(56) References Cited

U.S. PATENT DOCUMENTS

| | | |
|---|---|---|
| 2004/0002958 A1 | 1/2004 | Seshadri et al. |
| 2006/0218532 A1 | 9/2006 | Cordella et al. |
| 2009/0204666 A1* | 8/2009 | Sana ............... H04L 67/26 |
| | | 709/203 |
| 2010/0091965 A1 | 4/2010 | Ma et al. |
| 2010/0100626 A1* | 4/2010 | Allen ............ H04L 67/1095 |
| | | 709/227 |
| 2011/0213758 A1 | 9/2011 | Cao et al. |
| 2013/0339448 A1* | 12/2013 | Kahan ............ H04L 12/1859 |
| | | 709/204 |
| 2017/0163752 A1* | 6/2017 | Kaledhonkar ...... H04L 67/42 |
| 2018/0034862 A1* | 2/2018 | Friend ............. G06Q 30/02 |
| 2018/0167785 A1* | 6/2018 | Wang .............. H04W 4/06 |
| 2019/0273790 A1 | 9/2019 | Zhao |

FOREIGN PATENT DOCUMENTS

| | | |
|---|---|---|
| CN | 107566437 A | 1/2018 |
| CN | 107666432 A | 2/2018 |

OTHER PUBLICATIONS

"Communication with Supplementary European Search Report", EP Application No. 19803453.0, dated Jan. 27, 2022, 10 pp.
"Second Office Action and English language translation", CN Application No. 201810479229.6, dated Feb. 22, 2022, 23 pp.

\* cited by examiner

SUBSCRIPTION SERVER, SUBSCRIPTION TERMINAL, INFORMATION SUBSCRIPTION METHOD AND SYSTEM

CROSS-REFERENCE TO RELATED APPLICATIONS

The present application is the U.S. national phase entry of PCT/CN2019/074122, with an international filing date of Jan. 31, 2019, which claims the benefit of Chinese Patent Application No. 201810479229.6, filed on May 18, 2018, the entire disclosures of which are incorporated herein by reference.

FIELD

The present disclosure relates to the technical field of the Internet of Things, and particularly to a subscription server, a subscription terminal and an information subscription method and an information subscription system.

BACKGROUND

In the Internet of Things (IoT) system, M2M (Machine to Machine) is one of important aspects. M2M is a networked application and service taking intelligent interaction between machine terminals as a core. A machine may subscribe to an event of another machine so that it may obtain the event of the other machine when the other machine generates the event. Usually, the event might include a plurality of portions, e.g., a core portion and an auxiliary portion. The core portion is the core of the event. However, a core portion alone cannot meet the requirement of an application, and cooperation of the core portion with some other auxiliary portions may be needed in order to perform some comprehensive judgment.

A relevant method for obtaining event information using a mechanism of subscribing to an event is: sending a request for auxiliary information to obtain the auxiliary information after core information is obtained, and building a complete event after the auxiliary information is received. That to say, processing of an event cannot be performed immediately after core information of the event is obtained, because other auxiliary information needs to be further obtained. The problem with this method lies in that this might delay the processing of the event.

Another relevant method for obtaining event information using a mechanism of subscribing to an event is that it is required to subscribe to core information and auxiliary information of an event respectively in order to obtain full information of the event. However, since cycles for sending core information and sending auxiliary information are usually different, there might occur a situation in which a notified party constantly receives the auxiliary information from a notifying party, but still needs to wait for the core information before processing the event. The problem with this method lies in that in absence of core information of an event, reception of auxiliary information increases the processing burden of the notified party, and meanwhile increases network loads of both the notified party and the notifying party.

SUMMARY

In a first aspect, the present disclosure provides an information subscription method. The method comprises: establishing content information of a request from a first entity as first information of an event after determining that request information of the request satisfies an event notification rule in a subscription resource related to the first entity; obtaining second information of the event according to an associated object of the subscription resource; and sending a notification message containing the first information and the second information to a notified party of the subscription resource.

In some embodiments, the subscription resource comprises the event notification rule, the associated object, and a notification address identifier of the notified party.

In some embodiments, the subscription resource comprises the event notification rule and a notification address identifier of the notified party. The associated object is an associated object created in a container of a resource of the first entity.

In some embodiments, the associated object comprises an associated resource or an identification of associated resource. The obtaining the second information of the event according to the associated object of the subscription resource comprises: obtaining the second information of the event from the associated resource, or obtaining the second information of the event from a corresponding associated resource according to the identification of associated resource.

In some embodiments, before the determining, the method further comprises: receiving a subscription request for the first entity from a requester of the subscription resource, the subscription request comprising the event notification rule, the identification of associated resource, and the notification address identifier of the notified party. The subscription resource for the first entity is created according to the received subscription request.

In some embodiments, the subscription resource further comprises a notification content type, and an optional value of the notification content type comprises a type value of associated resource.

In some embodiments, obtaining the second information of the event according to the associated object of the subscription resource comprises: after determining that the notification content type is the type value of associated resource, obtaining the second information of the event according to the associated object of the subscription resource.

In some embodiments, the first entity is an application entity or a common service entity.

In some embodiments, the request comprises a content instance creation request or a content instance update request.

In some embodiments, the method further comprises: creating a new content instance in a container of a resource for the first entity according to the content instance creation request sent by the first entity, and storing the received information in the new content instance.

In some embodiments, the associated resource comprises a resource, a container or a content instance of an entity. The entity comprises an application entity or a common service entity.

In some embodiments, the associated resource is a resource of a second entity different from the first entity. Before obtaining the second information of the event according to the associated object of the subscription resource, the method further comprises: receiving the content instance creation request, the request sent by the second entity and carrying the second information of the event; creating a new content instance in a container of a resource of the second entity according to the content instance creation request sent by the second entity, and storing the second information of the event in the new content instance.

In some embodiments, the first information of the event is core information of the event, and the second information of the event is auxiliary information of the event.

In some embodiments, the core information of the event is occurrence information of a traffic accident, and the auxiliary information of the event location information of a vehicle involved in the accident. The first entity is a traffic accident recognition application entity, and the second entity is a vehicle location sensing application entity.

In a second aspect, the present disclosure further provides a subscription server. The subscription server comprises an establishment module, an obtaining module and a sending module. The establishment module is configured to establish content information of a request from a first entity as first information of an event after determining that request information of the request satisfies an event notification rule in a subscription resource related to the first entity. The obtaining module is configured to obtain second information of the event according to an associated object of the subscription resource. The sending module is configured to send a notification message containing the first information and the second information to a notified party of the subscription resource.

In some embodiments, the subscription server further comprises a creation module configured to create the subscription resource of the first entity according to a subscription request after the subscription request for the first entity from the requester of the subscription resource is received. The subscription request comprises the event notification rule, an identification of associated resource, and the notification address identifier of the notified party. The identification of associated resource is used to create the associated object.

In some embodiments, the subscription server further comprises a creation module configured to create the subscription resource of the first entity according to a subscription request after the subscription request for the first entity from the requester of the subscription resource is received. The subscription request comprises the event notification rule and the notification address identifier of the notified party.

In some embodiments, the obtaining module is configured to obtain the second information of the event according to the associated object of the subscription resource after the notification content type is determined to be a type value of associated resource.

In some embodiments, the request comprises a content instance creation request. The subscription server further comprises a receiving module and a creation module. The receiving module is configured to receive the content instance creation request sent from the first entity. The creation module is configured to create a new content instance in a container of a resource of the first entity according to the content instance creation request, and store the received information in the new content instance.

In some embodiments, the associated resource is a resource of a second entity different from the first entity. The receiving module is further configured to receive the content instance creation request, the request being sent by the second entity and carrying the second information of the event. The creation module is further configured to create a new content instance in a container of a resource of the second entity according to the content instance creation request sent by the second entity, and store the second information of the event in the new content instance.

In a third aspect, the present disclosure further provides a subscription terminal. The subscription terminal comprises a subscription request module and a notification message processing module. The subscription request module is configured to send a subscription request for a first entity to a subscription service entity to create a subscription resource related to the first entity. The subscription request comprises an event notification rule and a notification address identifier of a notified party of the subscription resource. The notification message processing module is configured to receive and process a notification message sent by the subscription service entity. The notification message comprises first information of an event identified according to content information of a request sent by the first entity and second information of the event obtained according to an associated object of the subscription resource.

In some embodiments, the subscription request further comprises: an identification of associated resource, which is used to create the associated object in the subscription resource.

In some embodiments, the subscription request also comprises a notification content type. The notification content type is set as a type value of associated resource.

In a fourth aspect, the present disclosure further provides an information subscription system. The information subscription system comprises a first entity, a subscription service entity as described above and a subscription terminal. The first entity is configured to send a request. The subscription terminal is configured to serve as a notified party of the subscription resource, and to receive and process the notification message.

In a fifth aspect, the present disclosure further provides another information subscription system. The information subscription system includes a first entity configured to send a request; a subscription service entity as described above; and a subscription terminal as described above. The subscription terminal serves as the notified party of the subscription resource, and is configured to receive and process the notification message.

In a sixth aspect, the present disclosure further provides a computer-readable medium having computer-readable instructions stored thereon. The computer-readable instructions, when executed by a computing device, cause the computing device to perform the method described above.

In a seventh aspect, the present disclosure further provides a computing device. The computing device comprises: one or more processors; and a memory on which a plurality of instructions are stored. The plurality of instructions cause the one or more processors to perform the method described above in response to being executed by the one or more processors.

BRIEF DESCRIPTION OF THE DRAWINGS

The present disclosure will be described in detail in some embodiments with reference to figures and in conjunction with specific embodiments, to make objectives, technical solutions and advantages of the present disclosure more apparent.

DETAILED DESCRIPTION

Figure 1:
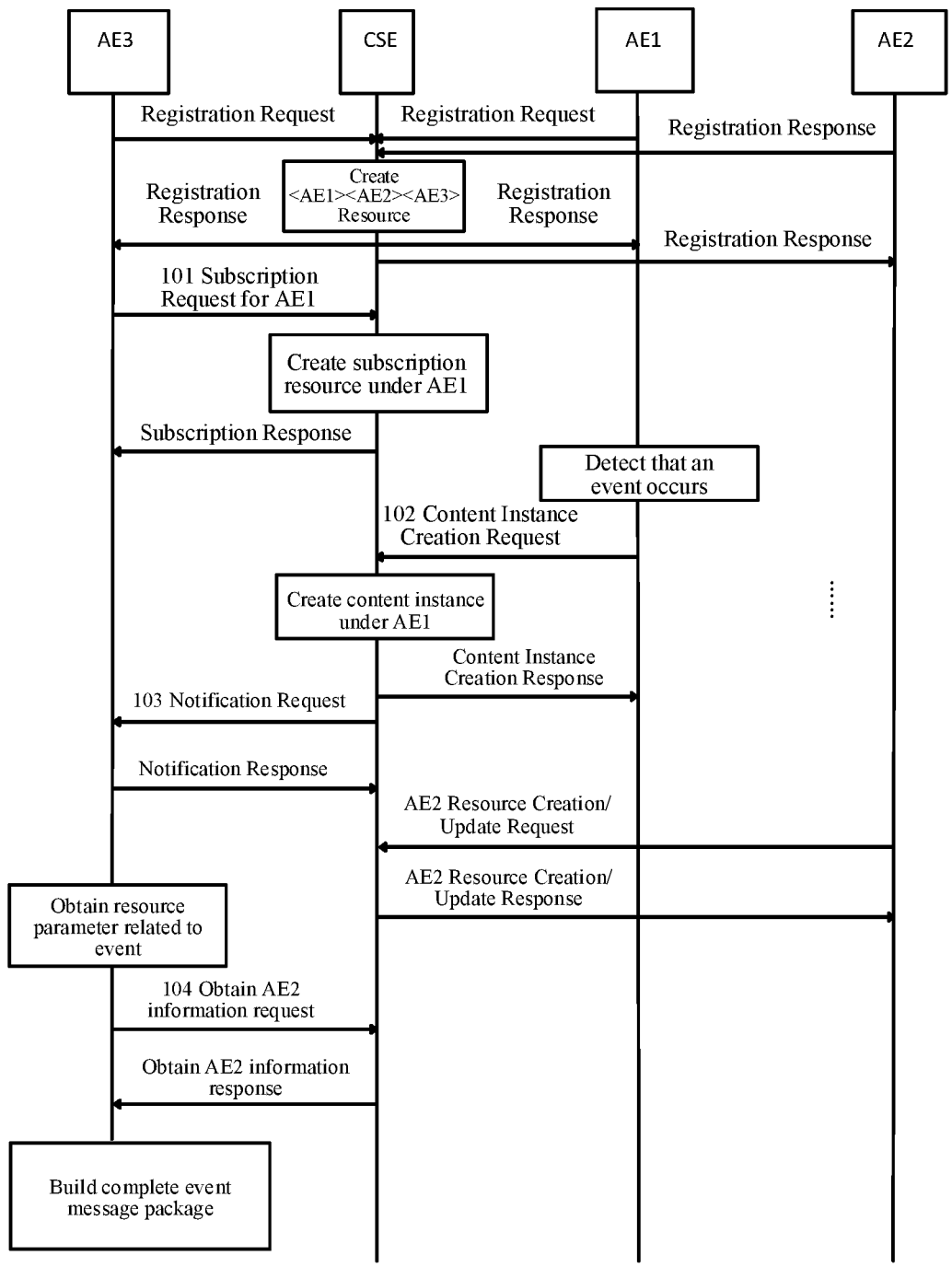
FIG. 1 is a flowchart of an information subscription method in related art.

Embodiments of the present disclosure are described in detail below. Examples of the embodiments are shown in the drawings, where the same or similar reference numerals denote the same or similar elements or elements with the same or similar functions throughout the specification. The embodiments described below with reference to the drawings are exemplary and are only used to illustrate the present disclosure, and cannot be construed as limiting the present disclosure.

Those skilled in the art would appreciate that "a", "an", "said" and "the" as used in this application may also be construed to include a plural form unless specified otherwise or clear from context to be directed to a singular form. The wording "and/or" used herein includes any or all possible combinations of one or more associated listed items.

It should be noted that all terms using "first" and "second" in the embodiments of the present disclosure are intended to distinguish two different entities or different parameters with the same names. In the context of the present disclosure, "first", "second", etc. are merely for convenience of expression, and should not be construed as limiting the embodiments of the present disclosure.

A functional framework of a M2M communication system defines an application entity (AE) and a common service entity (CSE). The application entity is an entity that implements service logic for a M2M application, such as a traffic accident handling application, the Internet of Vehicles application and an industrial control application. The common service entity represents an entity implementing a service function, which is instantiation of a group of "common service functions", mainly including data management, device management, subscription management and security mechanisms and so on.

FIG. 1 is a flowchart of an information subscription method in related art. In this method, a mechanism of subscribing to an event is used to obtain core information and auxiliary information of the event. FIG. 1 shows an application entity 1 (AE1), an application entity 2 (AE2), an application entity 3 (AE3), and a common service entity (CSE). In an exemplary scenario of traffic accident, AE1 may be a recognition application entity that recognizes a traffic accident, AE2 is a sensing application entity that senses traffic accident-related data, and AE3 is a management application entity that handles the traffic accident.

Initially, the application entity AE1 may be registered with the CSE by sending a registration request to the CSE. The CSE may create an AE1 resource for AE1 according to the registration request, and return a registration response to it.

Similarly, AE2 and/or AE3 may also be registered with the CSE. Upon successful registration, the CSE may create an AE2 resource and/or an AE3 resource locally accordingly.

In the example scenario, AE3 is configured to obtain traffic accident information in order to handle the traffic accident. To this end, AE3 needs to obtain occurrence information of the traffic accident (the core information of the event) sent by AE1 and location information of a vehicle involved in the accident (auxiliary information of the event) collected by AE2 before handling the traffic accident.

At 101, AE3 may send a subscription request for AE1 to CSE to subscribe to an event of AE1. Correspondingly, the CSE creates a subscription resource under the AE1 resource and sends a subscription response to AE3.

At 102, when detecting occurrence of an event (such as a traffic accident), AE1 sends the CSE a content instance creation request, which contains content information related to the occurred event, such as the occurrence information of the traffic accident. After receiving the request from AE1, the CSE creates a content instance under a container of the AE1 resource <AE1>/container, records the occurrence information of the traffic accident therein, and sends a content instance creation response to AE1.

At 103, the CSE further correspondingly generates a notification request regarding the event in AE1 to notify AE3. After receiving the notification request, AE3 sends a notification response to the CSE and obtains a resource parameter(s) related to the event.

When AE3 finds, from the obtained resource paramater(s), that it also needs to obtain information in AE2, including for example the location information of a vehicle involved in the traffic accident, before proceeding to further processing, AE3 sends the CSE an information request to obtain the information in AE2 at 104. The CSE responds to this information request by providing the information in the AE2. AE3 uses the information of AE1 and the obtained information of AE2 to construct a complete event message package for traffic accident handling.

The problem with this method is that AE3 cannot handle an event in time after it obtains core information thereof, because it needs to obtain further information possessed by other entities, thereby delaying the processing of the event. For a traffic accident, this means that the best rescue time might be missed.

Figure 2:
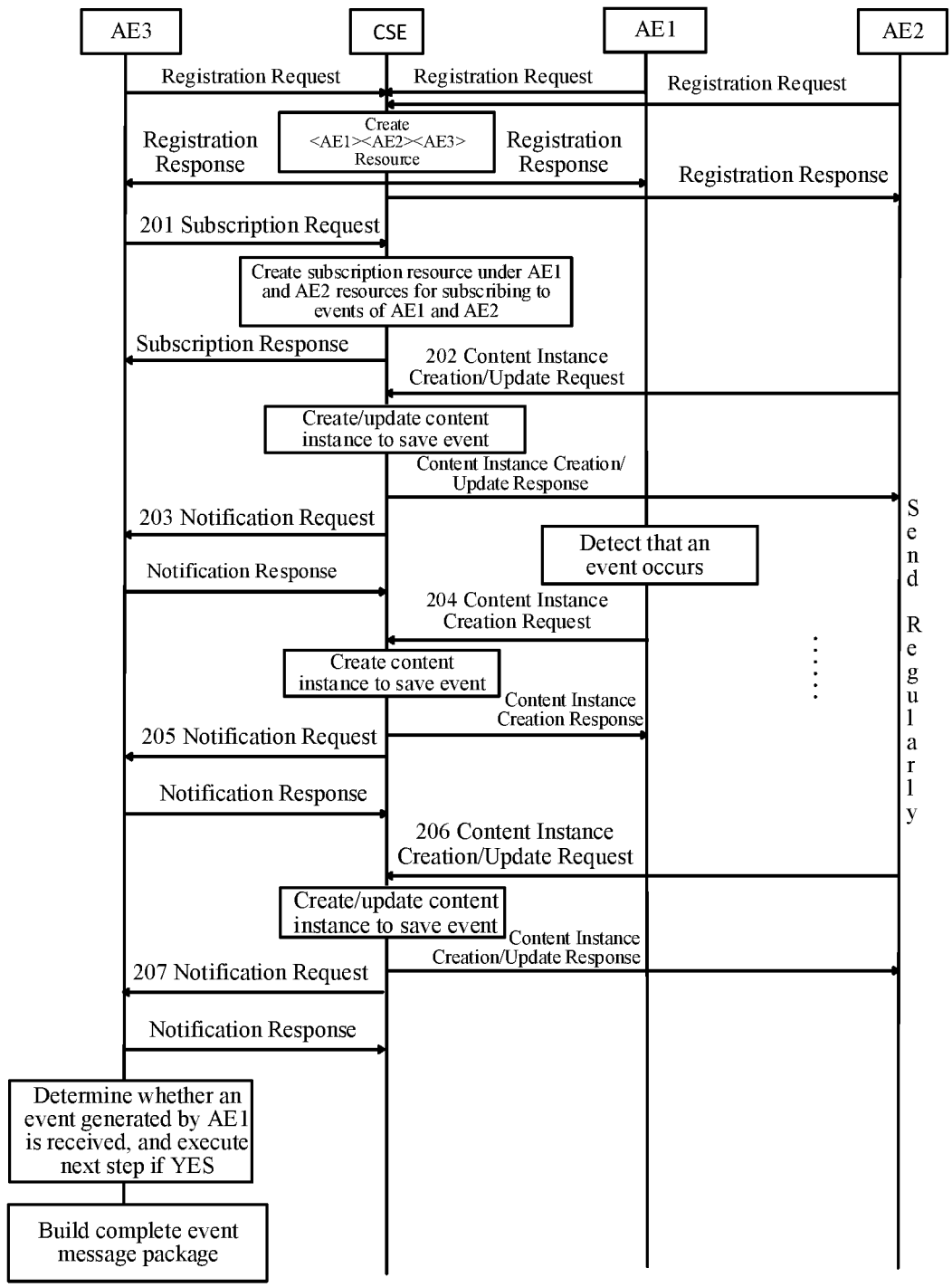
FIG. 2 is a flowchart of another information subscription method in related art.

FIG. 2 shows a flowchart of another information subscription method in related art. Similar to FIG. 1, AE1, AE2, AE3 and CSE are involved in FIG. 2, and initially, AE1-3 are all already registered on the CSE.

At 201, AE3 sends a subscription request for both AE1 and AE2 to the CSE to subscribe to the events of AE1 and AE2, respectively. As a result, the CSE creates respective subscription resources under the AE1 resource and the AE2 resource, and sends a subscription response to AE3.

At 202, AE2 periodically sends for example the location information of a vehicle to the CSE by sending a content instance creation/update request. Each time the CSE receives AE2's information, it creates/updates a content instance to save the event, and sends a content instance creation/update response to AE2.

At 203, the CSE also sends a notification request to AE3 accordingly to transfer information received from AE2. AE3 sends a notification response to the CSE after receiving the notification request.

At 204, upon detection of occurrence of an event, such as a traffic accident, AE1 sends the CSE a content instance creation request. After receiving the request from AE1, the CSE creates a content instance under the container of the AE1 resource <AE1>/container, records occurrence information of the traffic accident therein, and sends a content instance creation response to AE1.

At 205, the CSE further generates a notification request regarding the event in AE1 accordingly to notify AE3. AE3 sends the CSE a notification response after receiving the notification request.

In some scenarios, it may be possible that AE2 continues to send the location information of the vehicle after AE1 detects the traffic accident. In this way, at 206, AE2 sends for example the location information of the vehicle to the CSE by sending a content instance creation/update request. After receiving the information from AE2, CSE may again create/update a content instance to save the event, and sends a content instance creation/update response to AE2.

At 207, the CSE also sends a notification request to AE3 accordingly to transfer information received from AE2. AE3 sends a notification response to the CSE after receiving the notification request.

When determining that the event occurring in AE1 has already been received, that is, the occurrence information of the traffic accident in AE has been received, AE3 retrieves the information of AE2 that it receives previously. AE3 construct a complete event message package for traffic accident handling, using, for example, the event information in AE1 and the AE2 data closest to the time when the event in AE1 occurs.

The problem with this method is that, in e.g., a scenario of Internet of Vehicles, a cycle period for reporting occurrence information of a traffic accident is longer, while a cycle period for reporting location information of a vehicle is shorter. As such, a CSE will continuously send notification messages carrying auxiliary information, such as the location of the vehicle, to the notified party (such as AE3) who subscribes to that information. The notified party cannot make decision on an event according to the generated auxiliary information alone, and needs to wait for core information thereof, such as the occurrence information of the traffic accident. Therefore, in absence of the core information of the event, reception of the auxiliary information increases the processing load of the notified party, and also increases the network load of the notified party (e.g., AE3) and the notifying party (e.g., CSE).

According to embodiments of the present disclosure, there are provided a subscription service entity, a subscription terminal, an information subscription method and an information subscription system, which not only avoid increasing the network load of a notifying party and a notified party, but also ensure that there is enough information after a notification message of an event is received, so that the event can be handled in time.

In embodiments of the present disclosure, after a first entity (e.g., AE1) sends request information to a subscription service entity (e.g., CSE), if the subscription service entity determines that the request information satisfies an event notification rule in a subscription resource, the subscription service entity establishes content information of the request as first information of the event; and further obtains second information of the event from an associated object (e.g., a resource of AE2) of the subscription resource, and sends a notification message including the first information and second information to a notified party (e.g., AE3) of the subscription resource. As such, when the first information of the event is subscribed, the subscription service entity obtains the second information regarding the event as well to combine complete event information, which complete event information is sent to the notified party (e.g., AE3) in the notification message. In this way, on the one hand, the notified party who subscribes to the resource may handle the event in time according to the complete event information after receiving the notification message of the event, thereby avoiding time delay in event handling; on the other hand, since the second information of the event is not directly subscribed to, the number of notification messages used for transferring subscription information is reduced, and the network load of the notified party and a notifying party is reduced.

Figure 3:
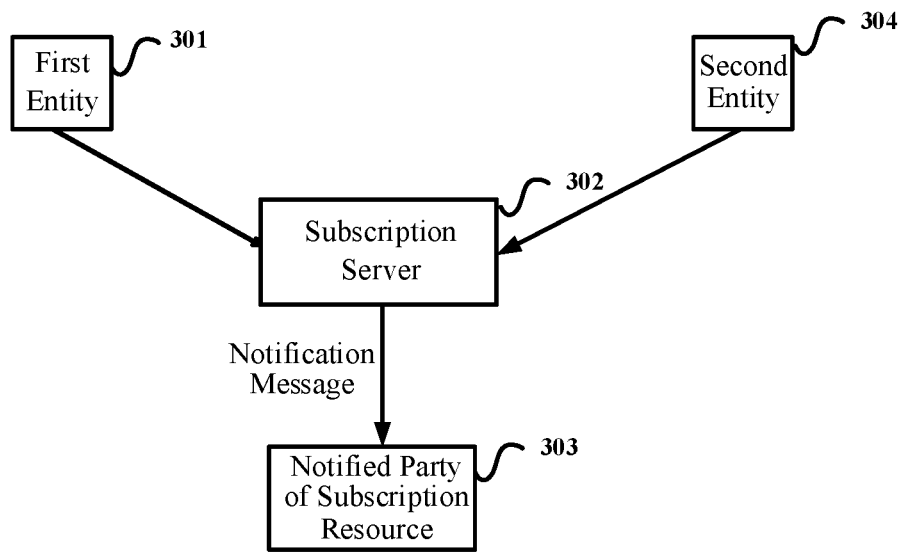
FIG. 3 is an architectural diagram of an information subscription system according to an embodiment of the present disclosure.

FIG. 3 shows an architectural diagram of an information subscription system according to an embodiment of the present disclosure. The information subscription system includes a first entity 301, a subscription server 302, and a notified party 303 of a subscription resource. The subscription server 302 may include a subscription service entity. In the following description, the subscription server and the subscription service entity are used interchangeably.

The first entity 301 is configured to send a request to the subscription server 302. The first entity may be a subscribed entity. In some embodiments, the first entity 301 may be an application entity (AE) in M2M communication.

In some other embodiments, the first entity may also be a common service entity. A functional framework of a M2M communication system defines an application service node (ASN), which may include a common service entity and at least one application entity. In such a scenario, the application entity may first register with a common service entity included in the same ASN. After that, the common service entity may send requests for creation, acquisition, update, deletion, notification and the like to the subscription service entity on behalf of the ASN, and receive a response(s) from the subscription service entity.

In some embodiments, the request may be a content instance creation request or a content instance update request. Exemplarily, the first entity sends the request upon detecting that an event occurs (for example, a traffic accident occurs or the location of a vehicle changes). Alternatively, the first entity may periodically send the request to periodically create or update the information stored in the subscription service entity. The request may include request information. The request information may be type information in order to indicate a type of the request, such as action involved in the request. Additionally or alternatively, the request information may also be content information in order to convey information related to, for example, the event.

The subscription server 302 is configured to identify content information of the request as first information of the event, after receiving and determining that the request information of the request sent by the first entity 301 satisfies an event notification rule in the subscription resource. The subscription resource may be a sub-resource created under the first entity resource, and it may include attributes, such as the event notification rule(s). The request information satisfying the event notification rule indicates that the content information of the request will be notified as an event to the notified party specified in the subscription resource.

The subscription server 302 further obtains second information of the event according to an associated object of the subscription resource. The associated object may include an associated resource or an identification of associated resource. In an example, the associated object may be a resource of the second entity 304. The second entity 304 may be an entity that has registered with the subscription server 302 and has a corresponding resource created thereon. The subscription server 302 may thus obtain the second information about the event from the second entity 304 through the resource of the second entity 304. The subscription server 302 sends a notification message containing the first information and second information of the event to the notified party 303 specified in the subscription resource. The subscription service entity in the subscription server 302 may be a common service entity (CSE) in M2M communication.

The notified party 303 of the subscription resource is configured to receive and process the notification message sent by the subscription service entity 302. The notified party 303 may handle relevant event based on the first and second information included in the notification message. The notified party 303 of the subscription resource may be an application entity (AE), or a common service entity (CSE). As used herein, the third entity and the notified party of the subscription resource may be used interchangeably.

In some embodiments, the first entity may register with the subscription server before sending information to the subscription server. After successful registration, the subscription server creates a resource for the first entity locally.

Figure 4:
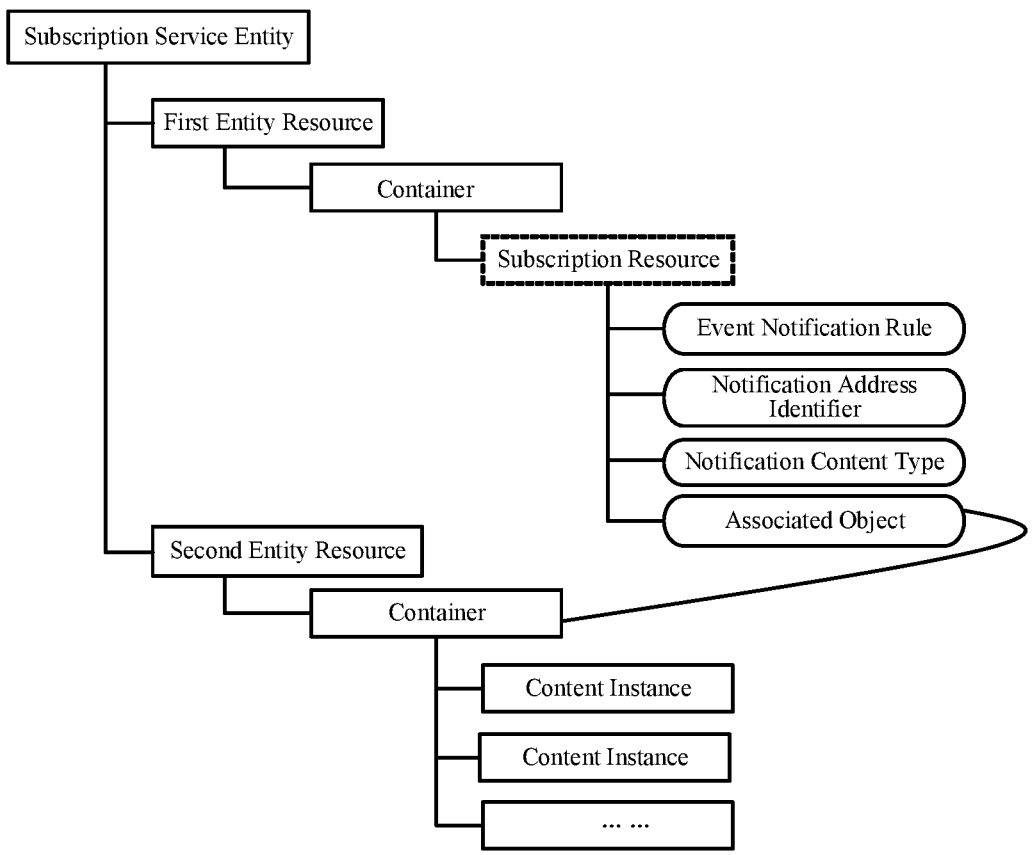
FIG. 4 is a data structure of resources created by a subscription service entity locally for a registered entity according to an embodiment of the present disclosure.

FIG. 4 is a data structure of resources created by a subscription service entity locally for registered entities according to an embodiment of the present disclosure. As shown in FIG. 4, after a first entity and a second entity are registered, the subscription service entity creates a first entity resource and a second entity resource for them, respectively. A sub-resource such as a container may further be created in the resource of each of the entities. FIG. 4 shows that a container of the first entity is further created in the first entity resource. A subscription resource may be created in the container. The subscription resource may include different attributes, such as an event notification rule, a notification address identifier, and an associated object. The notification address identifier may be for example a notification address of a notified party of the subscription resource, such as a URI (namely, a URI of the third entity). The existence of the associated object may indicate that the event notification of the subscription resource further involves other object(s) associated with the subscription resource. The associated object may be an identification of associated resource, which points to/associates with other sub-resource(s) in the same resource, or points to/associates with other resource(s) or sub-resource(s), such as containers or content instances, in other resources. As shown in FIG. 4, the associated object of the subscription resource of the first entity may point to a container of the second entity. Additionally or alternatively, the identification of associated resource may further include an identification of resource type, so as to point to/associate with one or more resources of the same type. This allows a plurality of resources to be associated simultaneously in a simple manner, thereby improving subscription efficiency.

Optionally, the attribute of the subscription resource may further include notification content type. When the notification content type is set as a value of associated resource type, this indicates that the notification message will contain relevant information of the associated object.

A content instance may also be created in a container. For example, a plurality of content instances may be created under the container of the second entity shown in FIG. 4. In some examples, the content instances may be created when an event occurs and specific content is generated, and may be used to save content information related to the event.

In this embodiment of the present disclosure, an associated object of a subscription resource is set in the subscription resource. As such, the associated object in the subscription resource may be managed, for example, set, changed or deleted, by a requester of the subscription resource through a subscription request.

Figure 5:
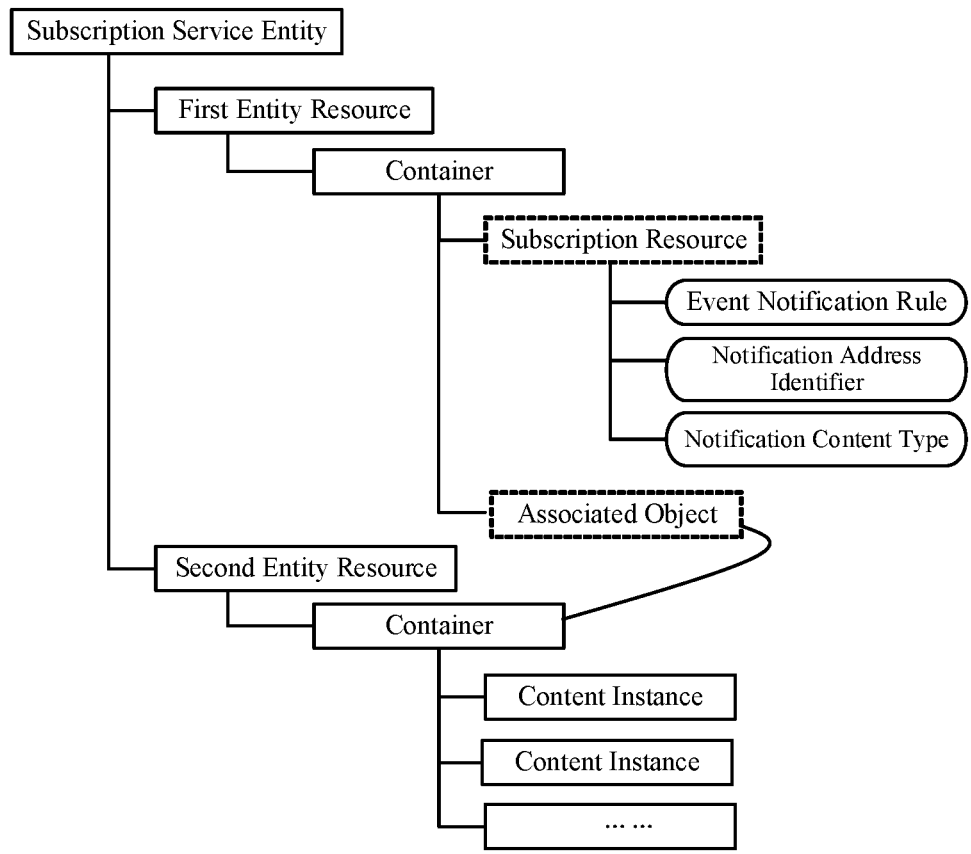
FIG. 5 is another data structure of resources created by a subscription service entity locally for a registered entity according to an embodiment of the present disclosure.

FIG. 5 shows another data structure of resources created by a subscription service entity locally for a registered entity according to an embodiment of the present disclosure. Similar to FIG. 4, the subscription service entity may create resources for registered entities, respectively. In resources of respective entities, sub-resources such as containers may also be created. Subscription resources, content instances etc. may be created in the containers. Unlike FIG. 4, the associated object of the subscription resource may be created as a sub-resource in a container of a resource of a subscribed entity (shown as the first entity in FIG. 5) instead of being created as an attribute of the subscription resource.

Since in this embodiment, the associated object of a subscription resource is directly set in a container of a resource of a subscribed party (e.g., the first entity) of the subscription resource, the associated object may not necessarily be set, changed or deleted individually by a requester of the subscription resource through a subscription request. Instead, the associated object may be shared by a plurality of subscription resources of the first entity. In some embodiments, the associated object may be set, changed, or deleted by a subscription service entity or the first entity.

Figure 6:
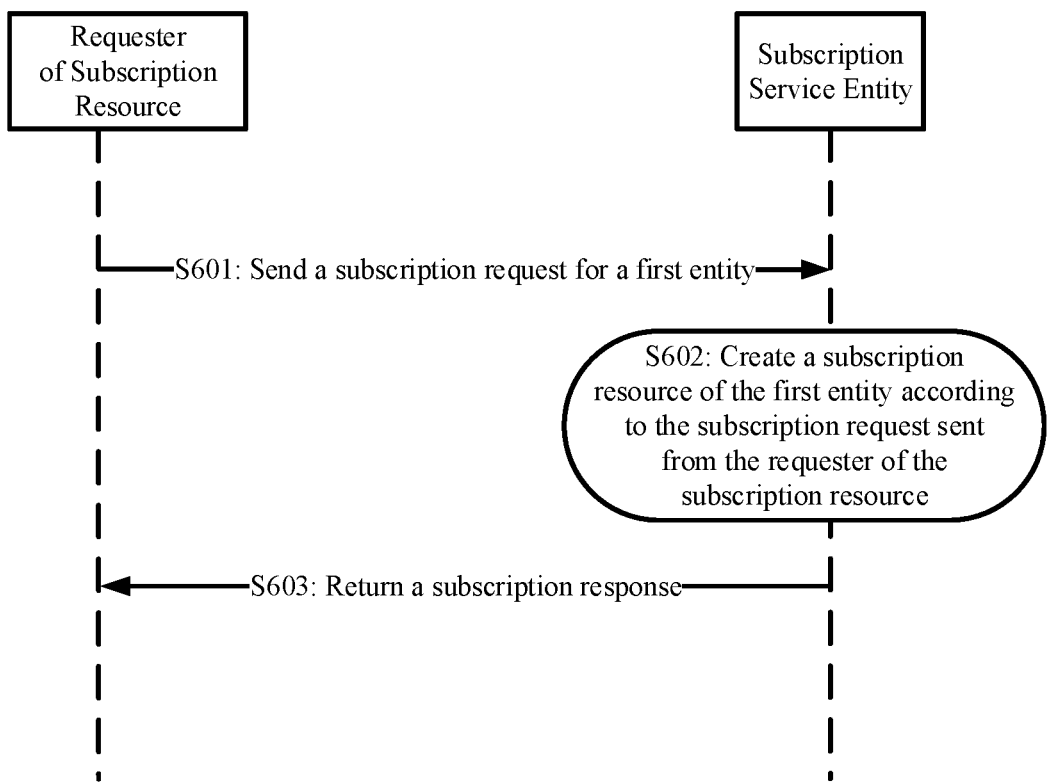
FIG. 6 is a flowchart of a method for a subscription service entity to create a subscription resource according to an embodiment of the present disclosure.

FIG. 6 is a flowchart illustrating a method for a subscription service entity to create a subscription resource according to an embodiment of the present disclosure.

S601: a requester of the subscription resource sends the subscription service entity a subscription request for a first entity. The requester of the subscription resource may be a notified party of the subscription resource itself, that is, it may be the third entity as described above. Alternatively, the requester of the subscription resource may send the subscription request for other entities and specify said other entities as the notified party in the subscription request. Thus, the requester may also be other entities registered on the subscription service entity.

Optionally, the subscription request for the first entity sent by the requester of the subscription resource to the subscription service entity includes an event notification rule, an identification of associated resource, and a notification address identifier (e.g., the URI of the third entity). As such, the relevant information of an associated object may be set or changed by the requester of the subscription resource through the subscription request. Alternatively, the subscription request sent by the requester may not include the identification of associated resource. In this way, the relevant information of the associated object may be set or changed by the subscription service entity.

Optionally, the subscription request may further include a notification content type. The notification content type may be set as a value of associated resource type.

S602: the subscription service entity creates the subscription resource of the first entity according to the subscription request sent by the requester of the subscription resource.

Optionally, the subscription service entity may create the subscription resource in a container of a resource of the first entity according to the subscription request sent by the requester of the subscription resource. The created subscription resource may include an event notification rule, an associated object and a notification address identifier, such as the URI of the notified party of the subscription resource (namely, the URI of the third entity). Alternatively, when the subscription request does not include the identification of associated resource, the created subscription resource may not include the associated object. At this time, the associated object created in the container of the resource of the first entity may be used as the associated object of the subscription resource.

The associated object may include an associated resource or an identification of associated resource. For example, the associated resource may be a resource/container/latest content instance of a second entity, or resource identifiers corresponding to these resources.

Optionally, for a case where the subscription request further includes notification content type, the created subscription resource may further include the notification content type. If the notification content type in the subscription request is set as a type value of associated resource, the notification content type in the created subscription resource is also set as the type value of associated resource. As such, even if the created subscription resource does not include an associated object, the subscription service entity may understand that event notification of the subscription resource further involves other associated resources.

S603: the subscription service entity returns a subscription response to the requester of the subscription resource in order to complete the subscription.

Additionally or alternatively, in addition to creating the subscription resource of the first entity according to the subscription request, the subscription service entity may create the subscription resource of the first entity locally according to a subscription resource creation instruction input by an administrator.

Figure 7:
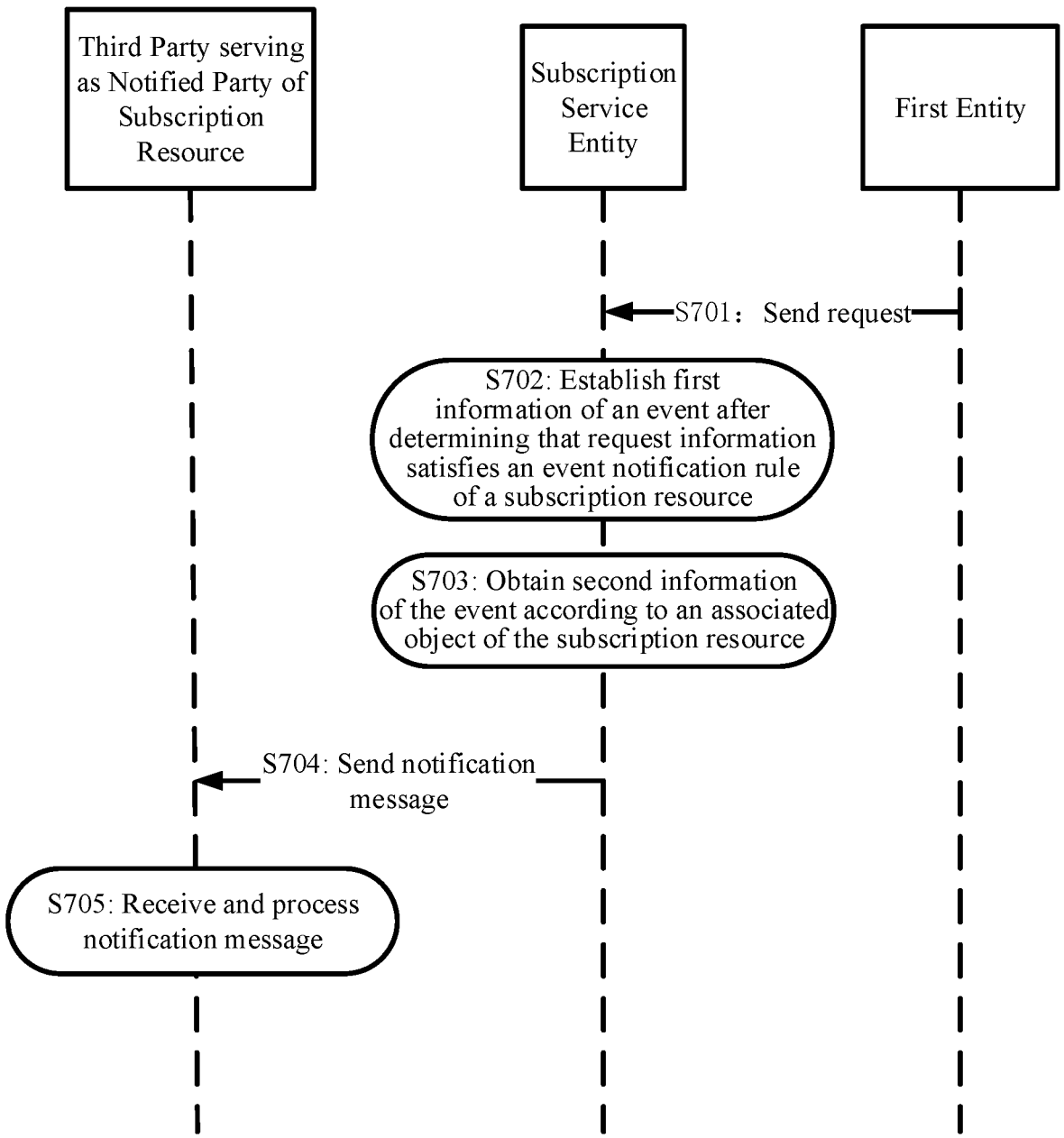
FIG. 7 is a flowchart of an information subscription method according to an embodiment of the present disclosure.

After the subscription resource of the first entity is created, the notified party of the subscription resource specified in the subscription request may receive subscription information about the first entity from the subscription service entity. FIG. 7 shows a flowchart illustrating an information subscription method according to an embodiment of the present disclosure.

S701: a first entity sends a request to a subscription service entity.

Optionally, the first entity may send the request to the subscription service entity after detecting an occurrence of an event. The request may be, for example, a content instance creation request or a content instance update request. The request may contain request information. For example, in the Internet of Vehicles scenario, the first entity may be a traffic accident recognition application module, which, after detecting that a traffic accident occurs, makes occurrence information of the traffic accident be carried in the content instance creation request and sends it to the subscription service entity so that the subscription service entity saves the relevant event.

S702: after determining that the request information in the request satisfies an event notification rule in a subscription resource of the first entity, the subscription service entity establishes content information of the request as first information of the event.

Optionally, the subscription service entity creates a new content instance in a container of a resource of the first entity according to the content instance creation request sent by the first entity, and stores the received information in the created content instance.

The subscription service entity compares the request information with an event notification rule(s) of the subscription resource. If the request information satisfies the event notification rule of the subscription resource, the content information of the request is identified as the first information of the event. Optionally, the first information of the event may be core information of the event. For example, in the Internet of Vehicles scenario, the core information of an event may be the occurrence information of the traffic accident.

In some embodiments, the request information may include the content information of the request. Accordingly, the event notification rule may be used to monitor specific content in the request. Additionally or alternatively, the request information may include type (action) information corresponding to the request. Accordingly, the event notification rule is for monitoring the type or action involved by the request.

In the exemplary Internet of Vehicles scenario, the request of the first entity may be a request to create a content instance 1 under a content container 1 (content is: isAccident=Y (is it an accident?=yes)). As a result, the type information is: creating a content instance 1 under the content container 1, and the content information is the content instance 1 under the content container 1 (content: isAccident=Y).

In an example, the event notification rule may monitor the specific content in the request, for example: when the notification event content=(isAccident=Y), the first information may be identified as the content instance 1 under the content container 1 (content: isAccident=Y). In another example, the event notification rule may monitor the type of request, for example: when the notification event type=creating a content instance under the content container 1, the first information may be identified as the content instance 1 under the content container 1 (content: isAccident=Y).

S703: the subscription service entity obtains second information of the event according to an associated object of the subscription resource. The associated object may be an attribute in the subscription resource, and is optionally created according to a subscription request. Alternatively, the associated object may also be created as a sub-resource in a container of the resource of the first entity, and may optionally be shared by a plurality of subscription resources of the first entity.

In some embodiments, for a case where the subscription resource includes the notification content type, a value of the notification content type may indicate the type of content contained in a notification message. The notification content type may include a plurality of optional values. For example, a value of the notification content type may be a type value of "modified attribute" to indicate that the content contained in the notification message is the modified attribute of the event. A value of the notification content type may also be a type value of "all attribute" to indicate that the content contained in the notification message is "all attributes" of the event.

According to an embodiment of the present disclosure, the value of the notification content type may further be extended to a type value of "associated resource" to indicate that the notification message further includes relevant information of an associated resource. In this way, a newly-added function of the embodiment of the present disclosure may be implemented by using the data structure in an existing subscription resource, that is, further carrying the relevant information of the associated resource in the notification message.

In some embodiments, in this step, after determining that the notification content type is the type value of associated resource, the subscription service entity may obtain the second information of the event according to the associated object in the subscription resource or outside the subscription resource.

The associated object of the subscription resource may include an associated resource or an identification of the associated resource. The subscription service entity may obtain the second information of the event from a corresponding associated resource according to the identification of the associated resource; or, the subscription service entity may directly obtain the second information of the event from the associated resource.

The associated resource may be a resource, container, or content instance of an entity (including the first entity and other entities). The entity may include an application entity, or a common service entity.

For example, the associated resource may be a resource of a second entity different from the first entity. Correspondingly, the identification of the associated object may be the identification of the resource of the second entity, and the subscription service entity may obtain the second information of the event from the resource of the second entity according to the identification of the resource of the second entity.

The second entity may be an entity pre-registered with the subscription service entity. When the second entity is registered with the subscription service entity, the subscription service entity also creates a resource of the second entity locally.

After the second entity is registered with the subscription service entity, the second information of the event may be carried in a content instance creation request and sent to the subscription service entity. The second information of the event may be auxiliary information of the event. Exemplarily, the second entity may arrange to send the second information to the subscription service entity regularly by utilizing the content instance creation request to carry the second information. For example, in the Internet of Vehicles scenario, the second entity may be a location sensing application module in a vehicle, and the second information of the event may be location information of the vehicle. The subscription service entity may be a roadside unit. The second entity may be arranged to carry the second information of the event (such as the location information of the vehicle) in the content instance creation request and send it to the subscription service entity periodically. Each time the subscription service entity receives the content instance creation request from the second entity, it creates a new content instance and stores the second information (e.g., the location information of the vehicle) of the event carried by the content instance creation request in the content instance. As such, after identifying that the content information of the request received from the first entity is the first information of the event, the subscription service entity may obtain the second information (e.g., the location information of the vehicle) of the event stored in the newly-created content instance from the associated object, namely, the resource of the second entity.

S704: the subscription service entity sends a notification message to the third entity that is a notified party of the subscription resource.

In this step, the subscription service entity sends a notification message containing the first and second information of the event to the third entity. The first and second information of the event may be the content of the information itself or an identification of the information.

S705: the third entity acting as the notified party of the subscription resource receives and processes the notification message.

In this step, after receiving the notification message that includes the first and second information of the event, the third entity may derive complete information of the event from the notification message, so as to immediately handle the event and avoid time delay of event handling. At the same time, there is no need to directly subscribe to the second information of the event of the second entity, which reduces the number of notification messages of subscription information and reduces the network load of the third entity and the subscription service entity. In the Internet of Vehicles scenario, the third entity may be a traffic accident management application module, which handles, after receiving the notification message, the traffic accident according to occurrence information of the traffic accident in the notification message and the location information of the vehicle.

Figure 8:
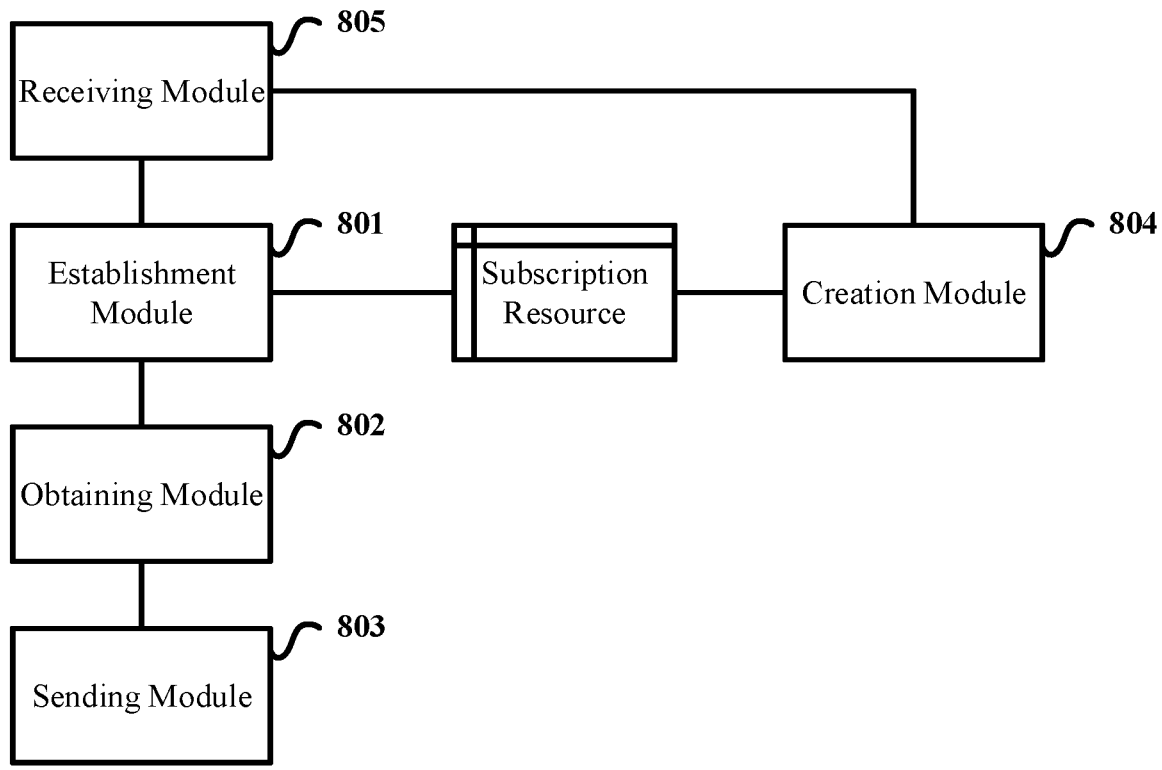
FIG. 8 is a block diagram of an internal structure of a subscription service entity according to an embodiment of the present disclosure.

FIG. 8 shows a block diagram of an internal structure of a subscription server according to an embodiment of the present disclosure. The subscription server includes an establishment module 801, an obtaining module 802, and a sending module 803.

The establishment module 801 is configured to identify content information of a request from a first entity as first information of an event after determining that request information of the request satisfies an event notification rule in a subscription resource of the first entity. The subscription resource includes the event notification rule and a notification address identifier of a notified party. The subscription resource further has a corresponding associated object. The associated object may be included as an attribute in the subscription resource, or may also be created as a sub-resource different from the subscription resource. The associated object includes an associated resource or an identification of the associated resource. In some embodiments, the subscription resource may further include a notification content type. Optionally, the first information of the event may be core information of the event.

The obtaining module 802 is configured to obtain second information of the event according to the associated object of the subscription resource. Optionally, after determining that the notification content type is a type value of associated resource, the obtaining module 802 obtains the second information of the event according to the associated object of the subscription resource. The associated resource may be other sub-resources of the first entity, or resources, containers, or content instances of other entities. Other entities may include application entities, or common service entities. Optionally, the second information of the event may be auxiliary information of the event.

The sending module 803 is configured to send a notification message containing the first and second information of the event to the notified party of the subscription resource.

In some embodiments, the subscription server may further include a creation module 804. The creation module 804 is configured to create the subscription resource of the first entity according to a subscription request for the first entity from a requester of the subscription resource after receiving the subscription request. The subscription request may include the event notification rule, the identification of the associated resource, and the notification address identifier.

In some embodiments, the subscription server may further include a receiving module 805. The receiving module 805 is configured to receive a content instance creation request from the first entity. The creation module 804 may create a new content instance in a container of a resource of the first entity according to the request, and store information carried by the received request (including the first information of the event) in the created content instance.

When the associated resource is, for example, the resource of the second entity, the receiving module 805 is further configured to receive a content instance creation request from the second entity that carries the second information of the event. The creation module 804 may create a new content instance in the second entity's container in the second entity's resource according to the content instance creation request sent from the second entity, and store the second information of the event in the newly-created content instance of the second entity.

It should be noted that all the possibilities discussed with respect to FIG. 6 and FIG. 7 are valid for FIG. 8 as well.

Exemplarily, the subscription server may be a computing device including a processor and a memory, which may take the form of a server, or may be a desktop computer, a notebook computer, a smartphone, a tablet computer, and other electronic devices including a processor and a memory.

Figure 9:
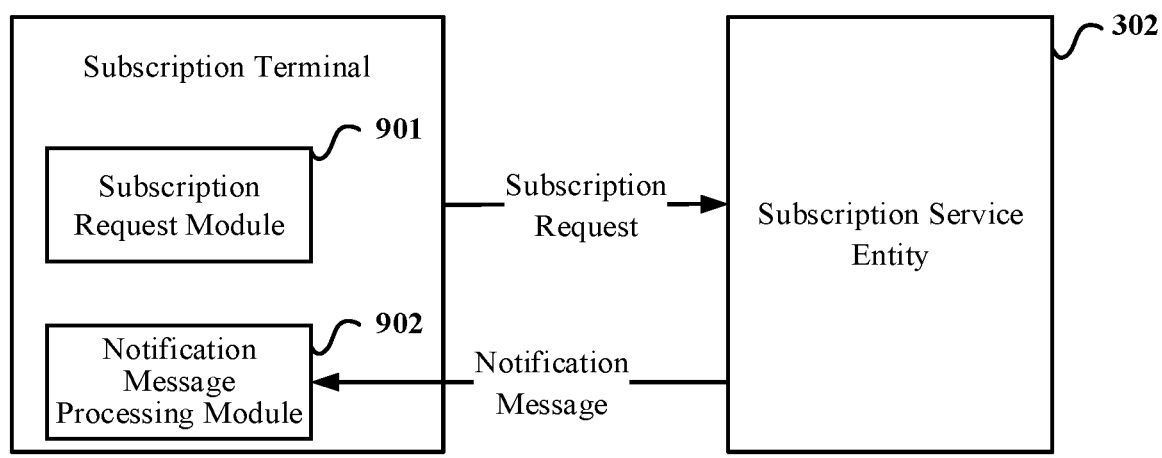
FIG. 9 is a block diagram of an internal structure of a subscription terminal according to an embodiment of the present disclosure.

FIG. 9 is a block diagram of an internal structure of a subscription terminal according to an embodiment of the present disclosure. The subscription terminal may serve as a requester of a subscription resource, and may also serve as a notified party of the subscription resource. The subscription terminal includes a subscription request module 901 and a notification message processing module 902.

The subscription request module 901 is configured to send a subscription request for a first entity to a subscription server to create a subscription resource related to the first entity. The subscription request includes an event notification rule(s), an identification of an associated resource, and a notification address identifier of a notified party. In some embodiments, the subscription request may further include a notification content type which is set as a type value of associated resource.

The notification message processing module 902 is configured to receive and process a notification message sent by the subscription server. The notification message includes first information of an event identified according to content information of a request sent by the first entity and second information of the event obtained according to an associated object of the subscription resource.

In an embodiment of the present disclosure, after the first information of the event is received from the first entity, the second information of the event may be obtained from a corresponding associated object according to the associated object of the first entity's subscription resource. In this way, the first and second information of the event may be sent to the notified party of the subscription resource together through the notification message. As such, the notified party can handle the event in time according to complete event information after receiving the notification message, thereby avoiding time delay of event handling. On the other hand, since the second information of the event is not directly subscribed to, the number of notification messages of subscription information is reduced, and the network load of the notified party and the notifying party is reduced.

According to an embodiment of the present disclosure, the value of the notification content type is extended so that an optional value of the notification content type may also be a type value of "associated resource" to indicate that the notification message contains relevant information of associated resource. As such, the newly-added functions in the embodiments of the present disclosure may be implemented by using the data structure in an existing subscription resource, thereby facilitating backward compatibility with a conventional subscription mechanism.

Exemplarily, the subscription terminal may be a TV, a smart home appliance, a charging car, a desktop computer, a notebook computer, a smartphone, a tablet computer, a game controller, a music player (such as an mp3 player, etc.), and any other terminal (for example, a mobile terminal, and a smart terminal) that includes a processor and memory.

As used herein, the terms "module", "system", and/or "interface", etc., are generally intended to refer to computer-related entities, either hardware, a combination of hardware and software, software, or software in execution. In some examples, a "module" may be a hardware unit configured as a processor, a functional block, or the like. This may include an application specific integrated circuit implemented with hardware or other logic devices formed using one or more semiconductors. The hardware units are not limited by the materials from which they are formed or the processing mechanisms employed therein. The hardware units may include components of the following items: integrated circuit or system-on-chip, Application Specific Integrated Circuit (ASIC), Field Programmable Gate Array (FPGA), Complex Programmable Logic Device (CPLD), and other implementations on silicon and other hardware devices. In other examples, the "module" may be a process running on a processor, a processor, an object, an executable file, a thread of execution, a program, and/or a computer, but is not limited thereto. For example, both the application running on a controller and the controller may be modules. One or more modules may reside in a process and/or thread of execution, and a module may be localized on one computer and/or distributed between two or more computers.

In addition, the claimed subject matter may be implemented as a method, apparatus or article of manufacture, which uses a standard programming and/or engineering technique to produce software, firmware, hardware, or any combination thereof to control the computer to implement the disclosed subject matter. When used herein, the term "article of manufacture" is intended to encompass a computer program accessible from any computer-readable device, carrier, or medium.

In addition, the present disclosure provides various operations of the embodiments. In an embodiment, one or more of the described operations may constitute computer-readable instructions stored on one or more computer-readable media, where the computer-readable instructions, when executed by a computing device, cause the computing device to perform the described operations. The order in which some or all operations are described should not be construed as implying that these operations are necessarily order dependent. Those skilled in the art who have the benefit of this description will realize alternative ordering. In addition, it will be appreciated that not all operations necessarily exist in every embodiment provided herein.

"Computer-readable medium" refers to a non-transitory medium and/or device that enable persistent storage of information, and/or a tangible storage device in contrast to mere signal transmission, carrier waves, or signals per se. Thus, the computer-readable medium refers to a non-signal bearing medium. The computer-readable medium includes hardware, such as volatile and nonvolatile, removable and non-removable medium and/or storage device implemented by a method or technology suitable for storing information such as computer-readable instructions, data structures, program modules, logic elements/circuits, or other data.

Examples of the computer-readable medium may include, but are not limited to, RAM, ROM, EEPROM, flash memory or other memory technologies, CD-ROM, Digital Versatile Disc (DVD) or other optical storage devices, hard disks, tape cassettes, magnetic tapes, magnetic disk storage devices or other magnetic storage devices, or other storage devices, tangible media, or articles of manufacture suitable for storing desired information and being accessible by a computer.

Those having ordinary skill in the art should appreciate that the discussion of any of the above embodiments is merely exemplary, and is not intended to imply that the scope of the present disclosure (including claims) is limited to these examples. Under the idea of the present disclosure, the technical features in the above embodiments or different embodiments may also be combined, and the steps may be implemented in any appropriate order. Moreover, there are many other variations in different aspects of the present disclosure as described above, and they are not provided in the details for brevity purpose. Therefore, any omission, modification, equivalent replacement, improvement, etc. made within the spirit and principle of the present disclosure shall be included in the protection scope of the present disclosure.

The invention claimed is:

1. A method for information subscription, comprising:
establishing content information of a request from a first entity as first information of an event after determining that request information of the request satisfies an event notification rule for a notified party of a subscription resource in a subscription resource related to the first entity;
receiving a content instance creation request that is sent by a second entity and carries a second information of the event; and
creating a new content instance in a container of a resource of the second entity according to the content instance creation request sent by the second entity, and storing the second information of the event in the new content instance;
obtaining, from an associated resource, the second information of the event of the second entity different from the first entity that is not directly subscribed by the notified party according to an associated object of the subscription resource in response to establishment of the content information of the request as the first information of the event, wherein the associated resource comprises a resource of the second entity and existence of the associated object indicates that an event notification of the subscription resource involves other resource(s) associated with the subscription resource; and
sending a notification message containing the first information and the second information to a notified party of the subscription resource as the event notification,
wherein the first information of the event comprises core information of an Internet of Vehicles event, and
wherein the second information of the event comprises auxiliary information of the Internet of Vehicles event.

2. The method according to claim 1, wherein the subscription resource comprises the event notification rule, the associated object, and a notification address identifier of the notified party.

3. The method according to claim 1, wherein the subscription resource comprises the event notification rule and a notification address identifier of the notified party, and the associated object is an associated object created in a container of a resource of the first entity.

4. The method according to claim 1, wherein the associated object comprises the associated resource or an identification of the associated resource, and wherein the obtaining from the associated resource the second information of the event comprises:
obtaining the second information of the event from the associated resource comprised in the associated object, or
obtaining the second information of the event from a corresponding associated resource according to the identification of associated resource.

5. The method according to claim 2, wherein before the determining, the method further comprises:
receiving a subscription request for the first entity from a requester of the subscription resource, the subscription request comprising the event notification rule, an identification of associated resource, and the notification address identifier of the notified party; and
creating the subscription resource for the first entity according to the subscription request that was received.

6. The method according to claim 1, wherein the subscription resource further comprises a notification content type, and an optional value of the notification content type comprises a type value of associated resource for indicating that the notification message is to contain relevant information of the associated object.

7. The method according to claim 6, wherein obtaining the second information of the event according to the associated object of the subscription resource comprises:
obtaining the second information of the event according to the associated object of the subscription resource after determining that the notification content type is the type value of associated resource.

8. A subscription server, comprising:
one or more processors; and
a memory on which a plurality of instructions are stored, the plurality of instructions, in response to being executed by the one or more processors, causing the one or more processors to perform operations comprising:
establish content information of a request from a first entity as first information of an event after determining that request information of the request satisfies an event notification rule for a notified party of a subscription resource in a subscription resource related to the first entity;
receive a content instance creation request that is sent by a second entity and carries a second information of the event; and
create a new content instance in a container of a resource of the second entity according to the content instance creation request sent by the second entity, and storing the second information of the event in the new content instance;
obtain, from an associated resource, the second information of the event of the second entity different from the first entity that is not directly subscribed by the notified party according to an associated object of the subscription resource in response to establishment of the content information of the request as the first information of the event, wherein the associated resource comprises a resource of the second entity and existence of the associated object indicates that an event notification of the subscription resource involves other resource(s) associated with the subscription resource; and send a notification message containing the first information and the second information to a notified party of the subscription resource as the event notification,
wherein the first information of the event comprises core information of an Internet of Vehicles event, and
wherein the second information of the event comprises auxiliary information of the Internet of Vehicles event.

9. The subscription server according to claim 8, wherein the subscription resource comprises the event notification rule, the associated object, and a notification address identifier of the notified party.

10. The subscription server according to claim 9, wherein the plurality of instructions, in response to being executed by the one or more processors, further cause the one or more processors to perform operations comprising:
create the subscription resource of the first entity according to a subscription request after the subscription request for the first entity from a requester of the subscription resource is received,
wherein the subscription request comprises the event notification rule, an identification of associated resource, and the notification address identifier of the notified party, and
wherein the identification of associated resource is for creating the associated object.

11. The subscription server according to claim 8, wherein the subscription resource further comprises a notification content type, and an optional value of the notification content type comprises a type value of associated resource.

12. The subscription server according to claim 11, wherein the plurality of instructions, in response to being executed by the one or more processors, further cause the one or more processors to obtain the second information of the event according to the associated object of the subscription resource after the notification content type is determined to be the type value of associated resource.

13. A subscription terminal, comprising:
one or more processors; and
a memory on which a plurality of instructions are stored, the plurality of instructions, in response to being executed by the one or more processors, causing the one or more processors to perform operations comprising:
send a subscription request for a first entity to a subscription server to create a subscription resource related to the first entity, the subscription request comprising an event notification rule for a notified party of the subscription resource and a notification address identifier of the notified party of the subscription resource; and
receive and process a notification message sent by the subscription server as an event notification of the subscription resource, the notification message comprising first information of an event identified according to content information of a request sent by the first entity and second information of the event of a second entity different from the first entity that is not directly subscribed by the notified party and obtained from an associated resource according to an associated object of the subscription resource in response to establishment of the content information of the request as the first information of the event, wherein the associated resource comprises a resource of the second entity and existence of the associated object indicates that the event notification involves other resource(s) associated with the subscription resource,
wherein the second information of the event is based on a content instance creation request that is sent by the second entity and carries the second information of the event,
wherein the second information of the event is stored in a new content instance in a container of a resource of the second entity according to the content instance creation request sent by the second entity,
wherein the first information of the event comprises core information of an Internet of Vehicles event, and
wherein the second information of the event comprises auxiliary information of the Internet of Vehicles event.

14. The subscription terminal according to claim 13, wherein the subscription request further comprises at least one from a group of an identification of associated resource that is used to create the associated object in the subscription resource, and a notification content type that is set as a type value of associated resource.

15. An information subscription system, comprising:
a first entity configured to send a request;
a subscription server according to claim 8; and
a subscription terminal configured to serve as a notified party of the subscription resource, and receive and process the notification message.

16. An information subscription system, comprising:
a subscription server according to claim 8;
a first entity configured to send the request; and
a subscription terminal comprising:
one or more processors; and
a memory on which a plurality of instructions are stored, the plurality of instructions, in response to being executed by the one or more processors, causing the one or more processors to perform operations comprising:
send a subscription request for the first entity to the subscription server to create the subscription resource related to the first entity, the subscription request comprising the event notification rule and a notification address identifier of the notified party; and
receive and process the notification message when the subscription terminal serves as the notified party of the subscription resource.

17. A non-transitory computer-readable medium having computer-readable instructions stored thereon, the computer-readable instructions, when executed by a computing device, causing the computing device to perform the method according to claim 1.

* * * * *